US007347017B2

(12) United States Patent
Shaffer, Jr.

(10) Patent No.: US 7,347,017 B2
(45) Date of Patent: Mar. 25, 2008

(54) MOBILE ADVERTISING FRAME

(76) Inventor: John Ripley Shaffer, Jr., 3978 Hammonds Ferry Ct., Evans, GA (US) 30809

(*) Notice: Subject to any disclaimer, the term of this patent is extended or adjusted under 35 U.S.C. 154(b) by 254 days.

(21) Appl. No.: 11/136,189

(22) Filed: May 24, 2005

(65) Prior Publication Data

US 2006/0265922 A1 Nov. 30, 2006

(51) Int. Cl.
*B60D 7/00* (2006.01)

(52) U.S. Cl. ............................ 40/591; 40/590; 40/588; 40/606.01; 40/606.03; 40/589; 296/21; 296/26.08; 296/26.09

(58) Field of Classification Search .................. 40/588, 40/589, 590, 591, 606.14, 606.16, 606.01, 40/606.03; 296/21, 26.08, 26.09
See application file for complete search history.

(56) References Cited

U.S. PATENT DOCUMENTS 5,255,464 A * 10/1993 Marecek ...................... 40/591
5,603,178 A 2/1997 Morrison
5,878,516 A 3/1999 Amirian
5,974,711 A 11/1999 Tipke
6,247,257 B1 6/2001 Powell
6,412,202 B1 7/2002 Oswood
6,418,650 B1 7/2002 Krewald
6,463,686 B1 10/2002 Eisenbraun
6,484,427 B1 11/2002 Santa Cruz et al.
6,702,351 B2 3/2004 Buring et al.
6,734,792 B1 * 5/2004 McElveen .................. 340/468
6,789,833 B1 * 9/2004 Alber ........................ 296/57.1
6,918,200 B2 * 7/2005 Pena ........................... 40/591
7,171,773 B2 * 2/2007 Haggard, Jr. ................ 40/591

* cited by examiner

*Primary Examiner*—Joanne Silbermann
*Assistant Examiner*—Shin Kim
(74) *Attorney, Agent, or Firm*—J. Bennett Mullinax, LLC

(57) ABSTRACT

An advertising frame for use with a vehicle so as to render the advertising frame mobile is provided. The advertising frame includes a vehicle engagement that is configured for engaging a vehicle. A signage member is included and is configured for carrying advertising signage. The signage member is pivotable with respect to the vehicle engagement member so as to be configured for providing access to the rear of a vehicle. A tailgate, hatch, trunk, spare tire or other component or portion of the rear of the vehicle may be accessed by pivoting the signage member out of the way.

11 Claims, 9 Drawing Sheets

MOBILE ADVERTISING FRAME

BACKGROUND OF THE INVENTION

Businesses, especially small businesses, are faced with the problem of skyrocketing costs of advertising in today's market. Roadside billboards are generally too expensive for most small businesses. As a cheaper alternative, mobile billboards or methods of placing advertising onto different sides of vehicles have been proposed so as to allow viewing by others when the vehicle is moving or parked.

Today, many motor vehicles are equipped with trailer hitch receivers that allow the vehicle operator to tow trailers, boats and other machinery. Trailer hitch receivers also allow for the attachment of other carriers for the transport of miscellaneous goods such as luggage, bicycles and general merchandise that would not otherwise fit into the cargo space of the vehicle. Devices are known that utilize the trailer hitch receiver of a vehicle for use in displaying advertising signage. For example, a frame that includes a trailer hitch attachment may be attached to the trailer hitch receiver of a vehicle and include a sign mounted thereon for advertisement purposes.

In some instances it may be desirable to provide advertising signage at the rear of a vehicle. The license plate, braking lamps, back-up lamps, and other vehicle components are located at the rear of the vehicle. Additionally, the rears of vehicles provide access to the cargo area of the vehicle and therefore include tailgates, hatches or trunks. Current advertising signage designed to attach to the trailer hitch receiver of a vehicle is limited in size due to the aforementioned constraints. For example, it is desirable that signage on the back of a vehicle not interfere with the opening and closing of the vehicle's tailgate or trunk. With such constraints, current advertising signage that utilizes the trailer hitch receiver of a vehicle is generally small and cannot be sized so as to be even close to the width or height of the rear of the vehicle.

Additionally, current advertising signage that may be used on the back of a vehicle with the trailer hitch receiver may not allow for the signage to be easily changed out. In this regard, the entire frame and sign must be replaced should a new sign be desired. Further, some frames configured for holding advertising signage do not allow for more modern innovations such as LED screens, scrolling screens, flat-screen displays and multi-display screens to be utilized.

SUMMARY

Various features and advantages of the invention will be set forth in part in the following description, or may be obvious from the description, or may be learned from practice of the invention.

The present invention provides for an advertising frame for use with a vehicle so as to render the advertising frame mobile. The advertising frame includes a vehicle engagement member that is configured for engaging a vehicle. Also included is a signage member that is configured for carrying advertising signage. The signage member is pivotable with respect to the vehicle engagement member so as to be configured for providing access to the rear of a vehicle. In certain instances, access to the tailgate, hatch, trunk, spare tire or other desired component or portion of the vehicle may be obtained.

Also provided for in accordance with the present invention is an advertising frame as previously mentioned in which the vehicle engagement member is configured for engaging a trailer hitch receiver of a vehicle. A base member may be attached to the vehicle engagement member and a hinge may be attached to the base member and to the signage member so as to render the signage member pivotable with respect to the base member.

A further exemplary embodiment exists in an advertising frame as previously discussed in which the base member is wider than the width of a trunk, tailgate, or hatch of a vehicle so at to allow access to compartments or objects in or on the rear of the vehicle.

Also provided for in accordance with another exemplary embodiment of the present invention is an advertising frame as previously discussed in which the signage member defines at least two channels. The channels are configured for receiving advertising signage so as to retain advertising signage onto the signage member.

A further exemplary embodiment exists in an advertising frame as previously discussed that further includes a light configured for illuminating advertising signage that may be carried by the signage member. Additionally or alternatively, a planar backing plate may be attached to the signage member so as to block wind from blowing through or past the signage member and thus against the advertising signage.

The present invention also provides for an advertising frame as previously discussed that includes advertising signage that may be a billboard, an electronic scrolling sign, an LED screen, a flat-screen display, and/or a multi-display billboard.

The present invention also provides for an advertising frame for use with a vehicle so as to render the advertising frame mobile. The advertising frame includes a vehicle engagement member that is configured for engaging a trailer hitch receiver of a vehicle. A base member is also included and is attached to the vehicle engagement member. The base member has a horizontal member attached to a pair of vertical members. A signage member is present and has an outer perimeter that is rectangular shaped. The signage member defines at least two channels that are configured for receiving advertising signage so as to retain the advertising signage onto the signage member. A hinge is attached to one of the vertical members of the base member and to the signage member so as to render the signage member horizontally pivotable with respect to the base member. Additionally, a planar backing plate is included and is attached to a signage member and configured for blocking wind from blowing through the signage member.

These and other features, aspects and advantages of the present invention will become better understood with reference to the following description and appended claims. The accompanying drawings, which are incorporated in and constitute part of the specification, illustrate embodiments of the invention, and, together with the description serve to explain the principles of the invention.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended FIGS. in which.

Figure 1:
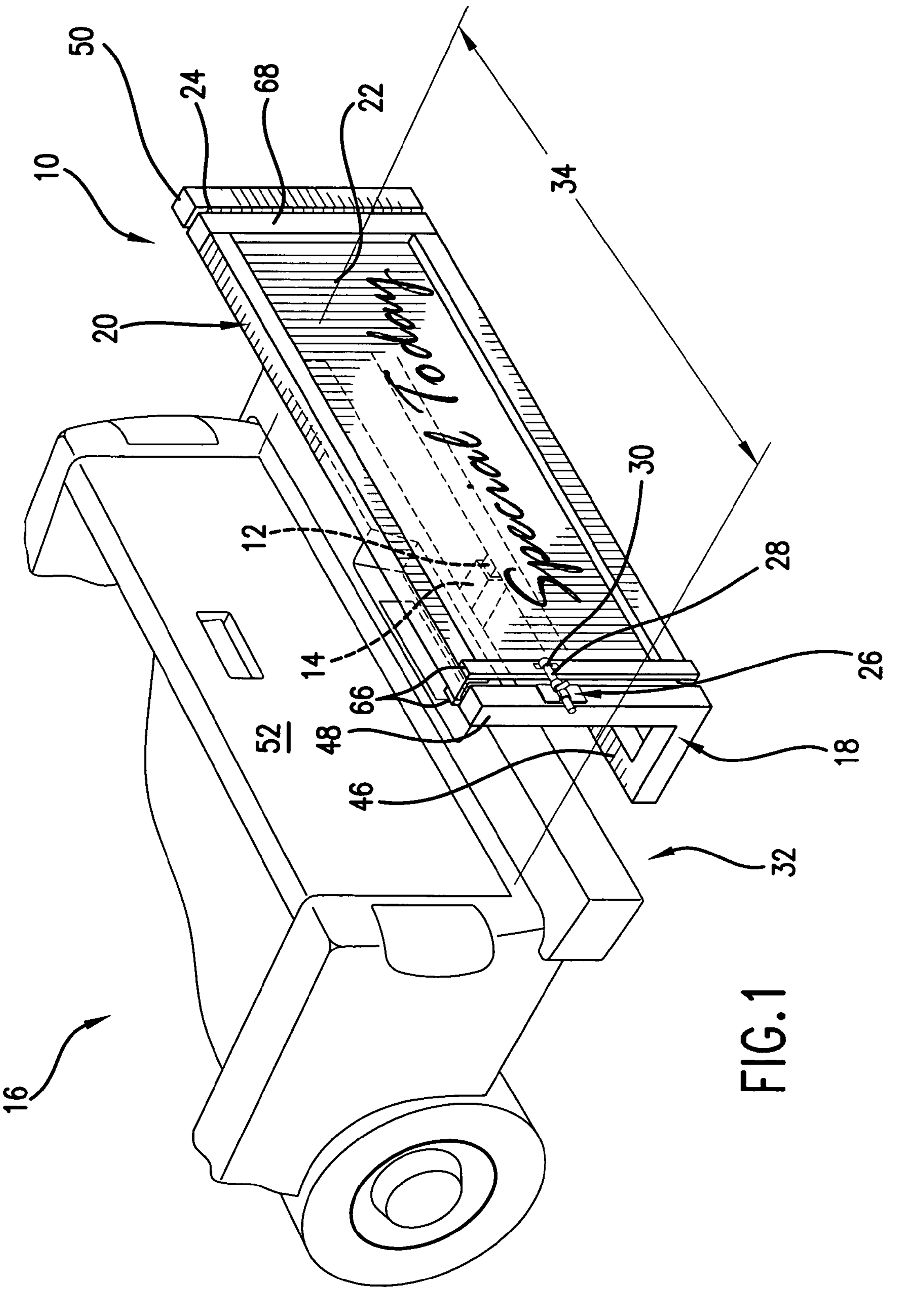
FIG. 1 is a perspective view of a vehicle with an advertising frame attached to a trailer hitch receiver in accordance with one exemplary embodiment.

Repeat use of reference characters in the present specification and drawings is intended to represent the same or analogous features or elements of the invention.

BRIEF DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to about 7 also includes a limit of up to about 5, up to about 3, and up to about 4.5.

The present invention provides for an advertising frame 10 for use with a vehicle 16 so as to render the advertising frame 10 mobile. The advertising frame 10 is configured to be carried on the vehicle 16. In certain exemplary embodiments, the advertising frame 10 includes a vehicle engagement member 12 designed so as to be carried on a trailer hitch receiver 14 of the vehicle 16. The advertising frame 10 also includes a signage member 20 that carries advertising signage 22 and is configured to be pivotable with respect the vehicle engagement member 12 so that access to the rear 32 of the vehicle 16 may be obtained. In this manner, the advertising frame 10 may carry advertising signage 22 of a substantial size so as to cover a large portion of the rear 32 of the vehicle 16. The advertising signage 22 may be a standard billboard type sign that has lettering, numbering or images printed on one side thereof. The advertising frame 10 may be capable of being pivoted out of the way so as to provide access for the user to open the tailgate 52, hatch or trunk of the vehicle 16.

FIG. 1 shows an exemplary embodiment of the advertising frame 10 attached to the rear 32 of a pickup truck 16. The advertising frame 10 includes a vehicle engagement member 12 that is attached to a trailer hitch receiver 14 of the vehicle 16 in a manner commonly known in the art. The vehicle engagement member 12 may be easily detachable from the vehicle 16 during times in which advertising is not desired. The vehicle engagement member 12 may be configured for attachment to any type of trailer hitch receiver 14, not just those shown in the figures. The advertising frame 10 includes a base member 18 attached to the vehicle engagement member 12 and sized so as to have components wider than the width 34 of the tailgate 52 of the vehicle 16 and/or other cargo areas or portions of the vehicle 16 sought to be accessed. A signage member 20 is included and holds advertising signage 22 that is sized so as to cover substantially all of the rear 32 of the vehicle 16. A hinge 24 attaches the signage member 20 to the base member 18 and places these two components into pivotable engagement with one another.

Figure 2:
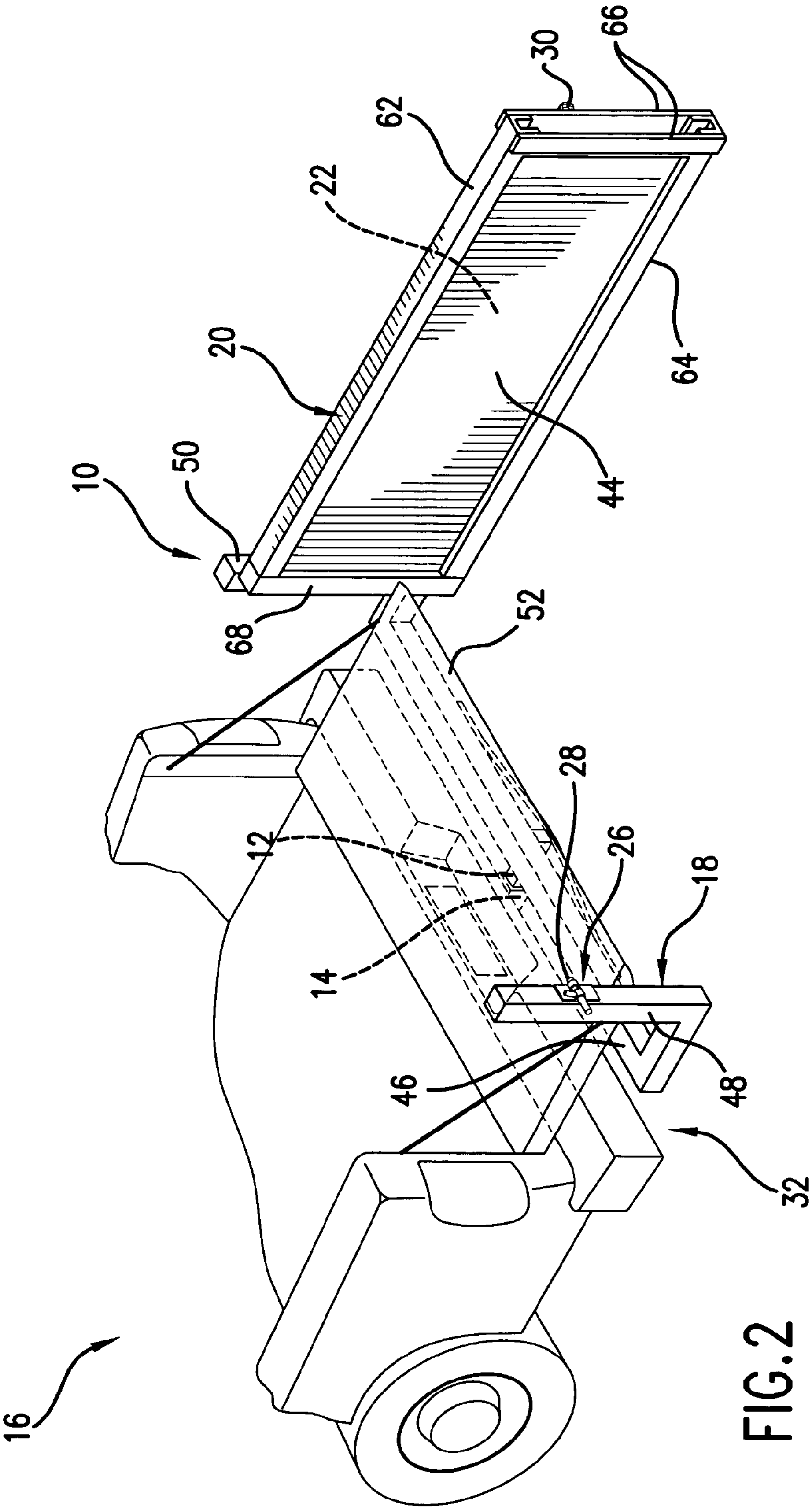
FIG. 2 is a perspective view of the advertising frame of FIG. 1 in which the signage member is pivoted with respect to the vehicle to allow for opening of the tailgate of the vehicle.

FIG. 2 shows the signage member 20 of FIG. 1 swung into the open position. As the base member 18 is wider than the tailgate 52 of vehicle 16, the advertising frame 10 provides room for the user to lower the tailgate 52 of the vehicle 16 without obstruction. In this manner, the advertising frame 10 is beneficial in that it allows for advertising signage 22 of a sufficient size to be employed on the rear 32 of the vehicle 16 while still allowing a user of the vehicle 16 to access components or portions of the rear 32. Pivoting of the signage member 20 allows for trunks, hatches and other compartments in the rear 32 of the vehicle 16 to be accessed. Additionally, other components on the rear 32 of the vehicle 16 may be accessed such as spare tires. It is to be understood that the use of the advertising frame 10 in allowing for the lowering of the tailgate 52 as shown in FIGS. 1 and 2 is but one example of the utility of the advertising frame 10.

Figure 3:
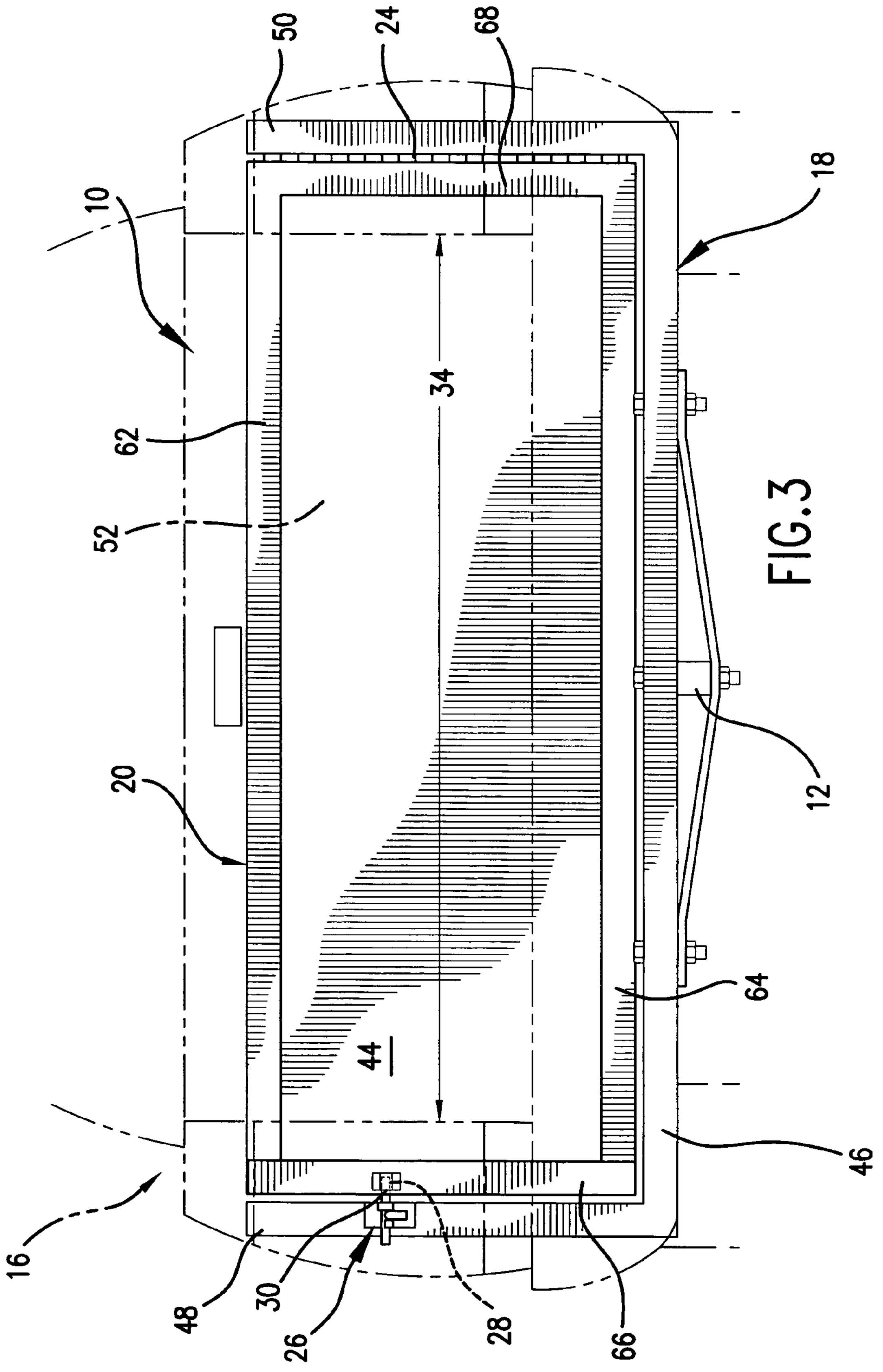
FIG. 3 is a front view of an advertising frame in accordance with one exemplary embodiment.

FIG. 3 is a front view of the advertising frame 10 without the presence of the advertising signage 22. As shown, the base member 18 is a substantially U-shaped component that includes a horizontal member 46 attached to two vertical members 48 and 50. The distance between the inner surfaces of the vertical members 48 and 50 is desirably larger than the width 34 of the tailgate 52 of the vehicle 16 as shown in FIGS. 1 and 2 so as to allow for opening of the tailgate 52 without removal of the advertising frame 10. The distance between the inner surfaces of the vertical members 48 and 50 may be sized so as to allow for the opening of trunks and hatches along with allowing access to other components on the rear 32 of the vehicle 16. However, in accordance with other exemplary embodiments of the present invention, the distance between the vertical members 48 and 50 may be made smaller in the event access to only a portion of the rear 32 of the vehicle 16 is desired. For example, if one desires only to be able to access a spare tire located on the rear 32 of the vehicle 16, the base member 18 may be sized accordingly so that the width 34 of the tailgate 52 of the vehicle 16 is in fact larger than the distance between the vertical members 48 and 50.

The base member 18 may be sized so that the vertical members 48 and 50 are spaced apart at a larger distance than the width of the vehicle 16 and/or the width of the rear 32 of the vehicle 16. Of course, the base member 18 may be sized to be narrower than the width of the vehicle 16 and/or the width of the rear 32 of the vehicle 16 in other exemplary embodiments. When measuring the distances between the vertical members 48 and 50, the distance between the inner surfaces of these members are measured. The distance between the vertical members 48 and 50 may be from two inches to six inches greater than the width of the trunk, tailgate 52, hatch, or component on the vehicle 16 in accordance with various exemplary embodiments. It is to be understood, however, that in accordance with yet other exemplary embodiments that the width of the vertical members 48 and 50 or the advertising frame 10 in general may be less than the width of the trunk, tailgate 52, hatch, or component on the vehicle 16.

A hinge 24 is attached to the vertical member 50 and to the signage member 20. Hinge 24 is capable of allowing the signage member 20 to pivot with respect to the base member 18 and may be selected so as to be any type of component capable of performing this function. For instance, the hinge 24 may be a piano hinge in accordance with one exemplary embodiment. Alternatively, the hinge 24 need not be a separate component of the advertising frame 10 but may be instead formed upon shaping a portion of the base member 18 and the signage member 20 so that these two components are engaged and pivotable with respect to one another. Further, the hinge 24 may be provided in any number or any manner in accordance with various exemplary embodiments. For example, the hinge 24 may be provided so as to include a spring therein that acts to control the opening of the signage member 20 and to urge the signage member 20 back into a closed position once the user lets go.

As shown in FIG. 3, the hinge 24 is attached to the vertical member 50 and to the signage member 20 so as to cause the signage member 20 to pivot about the vertical member 50 while maintaining the same vertical position. As such, the signage member 20 is horizontally pivoted in the exemplary embodiment shown in FIG. 3 because the signage member 20 pivots only in the horizontal direction.

The other vertical member 48 of the base member 18 is provided with a latch 26 that may be used to fix the position of the signage member 20 with respect to the base member 18. The latch 26 may be variously configured in accordance with different exemplary embodiments. For instance, the latch 26 may include a pin 28 that is received within a receiver 30 located on the signage member 20 so as to fix the position of the signage member 20 with respect to the base member 18. It is to be understood that various ways and mechanisms for locking the position of the signage member 20 with respect to the base member 18 may be employed in accordance with other exemplary embodiments. Further, other exemplary embodiments do not include a latch 26 or other mechanism used to fix the position of the signage member 20 with respect to the base member 18.

The vertical members 48 and 50 may be sized so as to be any desired height. For example, the vertical members 48 and 50 may be from two feet to four feet in accordance with certain exemplary embodiments so as to allow for the signage member 20 to be sized accordingly. The base member 18, including the vertical members 48 and 50 if present, may be larger than the height of the vehicle 16 in certain exemplary embodiments. Additionally, it is to be understood that the various components of the advertising frame 10 may be made of any suitable material. For example, steel, aluminum, plastic, or any suitable material may be used to make the vehicle engagement member 12, base member 18, signage member 20, and other components of the advertising frame 10. As such, the advertising frame 10 is not limited to construction by a particular type of material.

The vehicle engagement member 12 may be attached to the base member 18 in a variety of manners. For instance, these two components may be welded onto one another or may be attached through the use of mechanical fasteners such as bolts or pins. Further, in accordance with other exemplary embodiments, the vehicle engagement member 12 may be made integral with the base member 18 so that the vehicle 16 is attached essentially directly to the base member 18. The components making up the advertising frame 10 may be made of any material and may be sized and shaped in a variety of manners. For example, the vehicle engagement member 12 and the base member 18 may be made of steel or aluminum and may be shaped in the form of solid rods, hollow rods, I-beams, channels, square tubular members and/or flat bars in accordance with various exemplary embodiments.

Figure 4:
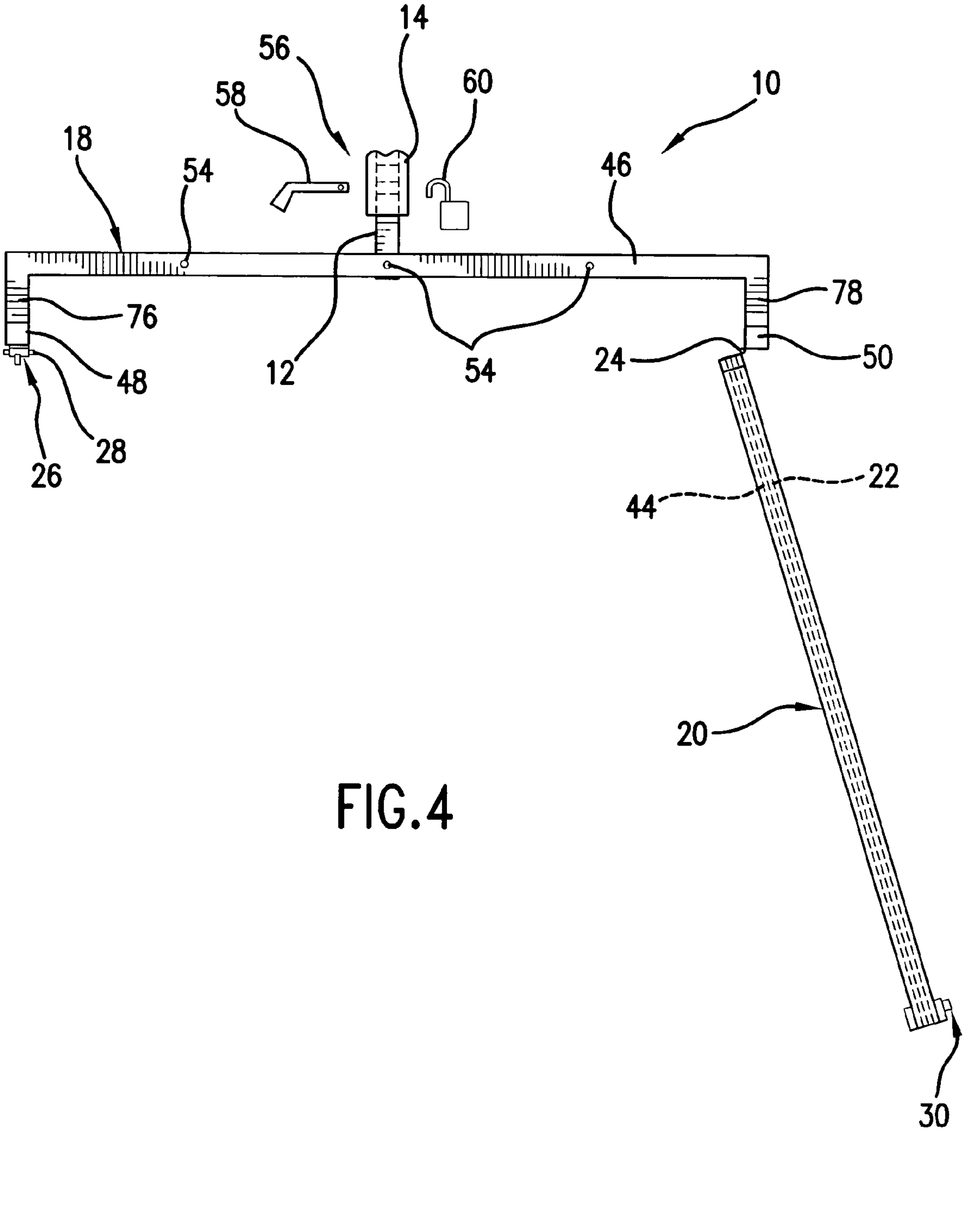
FIG. 4 is a top view of the advertising frame of FIG. 3.

FIG. 4 is a top view of the advertising frame 10 of FIG. 3 shown proximate to a trailer hitch receiver 14 of a vehicle 16. The vehicle engagement member 12 is rectangular tubing sized so as to be received within the trailer hitch receiver 14. The trailer hitch receiver 14 may be a rectangular shaped receptacle that receives the vehicle engagement member 12 that is in turn a rectangular shaped tubular member. The vehicle engagement member 12 and the trailer hitch receiver 14 may both have square shaped cross sections in accordance with one exemplary embodiment. Alternatively, the cross sections of the vehicle engagement member 12 and the trailer hitch receiver 14 need not be the same as one another in other embodiments. The vehicle engagement member 12 may be a three-inch square tube in accordance with one exemplary embodiment. A variety of pins or other fasteners used to releasably attach and detach the vehicle engagement member 12 and the trailer hitch receiver 14 may be employed.

Once received therein, a trailer hitch receiver lock 56 may be employed in order to lock the vehicle engagement member 12 into the trailer hitch receiver 14. The trailer hitch receiver lock 56 includes a pin 58 that has one end larger than the other so that the smaller end may be moved completely through holes disposed in the vehicle engagement member 12 and the trailer hitch receiver 14 and positioned on one side thereof while the larger end of the pin 58 is positioned on the other side. A lock 60 may be attached to the smaller end of the pin 58 and secured thereon so as to prevent removal of the advertising frame 10 and vehicle engagement member 12 from the trailer hitch receiver 14. The pin 58 cannot be slide out of engagement while the lock 60 is in place because the larger end of the pin 58 is sized so as to be greater than the hole through the trailer hitch receiver 14. Although FIG. 4 shows one way in which the vehicle engagement member 12 may be received and attached to the vehicle 16, it is to be understood that other ways of carrying the advertising frame 10 onto the vehicle 16 are possible in accordance with other exemplary embodiments and that the arrangement shown in the FIGS. is only exemplary. For instance, the advertising frame 10 may be attached to a ball-type hitch receiver located on the vehicle 16, the roof of the vehicle 16, the undercarriage of the vehicle 16, the side of the vehicle 16, the bumper of the vehicle 16, or to the rear 32 of the vehicle 16 in accordance with various exemplary embodiments.

The base member 18 includes a pair of sections 76 and 78 that extend from the horizontal member 46. The sections 76 and 78 are sized so as to allow the vertical members 48 and 50 along with the signage member 20 to be offset a desired distance from the horizontal member 46 and the rear 32 of the vehicle 16. The sections 76 and 78 may be selected so as to provide for any desired offset. For example, the sections 76 and 78 may provide for a six-inch offset of the vertical members 48 and 50 from the horizontal member 46. In accordance with other exemplary embodiments, the sections 76 and 78 may be sized so as to be from six inches to twenty-four inches in length. Alternatively, the base member 18 may be designed so as to not include the section 76 and 78. In this manner, the vertical members 48 and 50 along with the signage member 20 may be located directly above the horizontal member 46. Alternatively, other configurations of the advertising frame 10 are possible so as to offset any desired portion of the advertising frame 10 from the rear 32 of the vehicle 16.

The base member 18 includes three holes 54 in the horizontal member 46. The three holes 54 may be provided so as to afford bracing of the advertising frame 10. In this manner, bolts may be disposed through the holes 54 and into the bumper or other portion of the vehicle 16 to further secure the advertising frame 10 thereon. Any number of holes 54 may be employed in accordance with various exemplary embodiments. For instance, up to twelve holes 54 may be used in accordance with certain exemplary embodiments to securely fasten the advertising frame 10 to the vehicle 16. Additionally, no holes 54 may be used in accordance with other exemplary embodiments.

Figure 5:
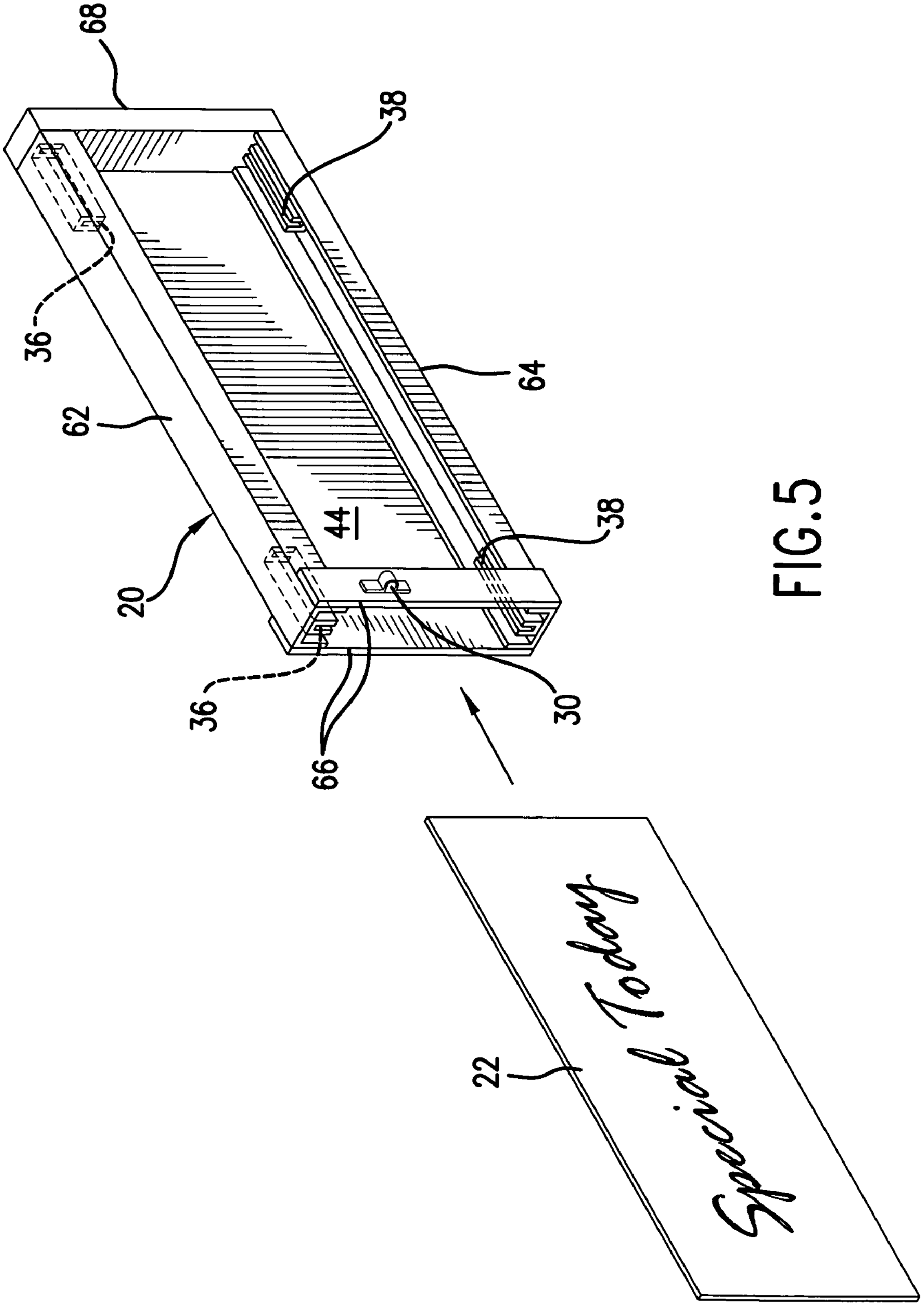
FIG. 5 is a perspective view of a signage member used with the advertising frame in accordance with one exemplary embodiment. The signage member is adapted for receiving a billboard.

FIG. 5 is a perspective view of the signage member 20 shown in accordance with one exemplary embodiment. Here, the signage member 20 includes a top 62 and a bottom 64 that are made of two inch channel that are reduced to ½ inch channels 36 and 38 on one end thereof into which the advertising signage 22 may be inserted. Channels 36 and 38 receive and hold the advertising signage 22 into position. Although desired as 2 inch and ½ inch, the channels 36, 38, 62 and 64 may be of any size in other embodiments.

A variety of mechanisms may be employed to render the signage member 20 capable of holding the advertising signage 22. For example, the channels 36 and 38 may extend a certain length, such as four inches to twelve inches, across the signage member 20. Alternatively, the channels 36 and 38 may be defined across the entire length of the top 62 and bottom 64 of the signage member 20. Still further, opposite ends of the top 62 and bottom 64 may have the channels 36 and 38. The channels 36 and 38 may be sized so as to snuggly receive the advertising signage 22 so that the advertising signage 22 is held thereon without the need for additional fasteners or other components so as to securely fit the advertising signage 22 to the signage member 20. The signage member 20 may be designed so as to allow for the advertising signage 22 to be easily removed and replaced. Although channels 36 and 38 are shown to retain the advertising signage 22 to the signage member 20, it is to be understood that a variety of mechanisms are possible and known in the art that may be used so as to affect attachment of the advertising signage 22 and the signage member 20. The configuration shown in FIG. 5 is but one exemplary embodiment and it is to be understood that other configurations are possible.

The signage member 20 also includes a side 66 and a side 68 located on opposite ends of the top 62 and bottom 64. The side 66 may be made of two inch flat bar while the side 68 may be made of tubing or two inch channel. The side 66 is configured so as to allow for the advertising signage 22 to be slid therethrough and into the signage member 20. Additionally, the side 66 is configured so as to allow for the advertising signage 22 to be easily removed from the signage member 20. In one configuration, the side 66 includes a pair of two-inch flat bars through which the advertising signage 22 may be slid. The side of the signage member 20 through which the advertising signage 22 may be removed and inserted may be opposite from the side that is hinged to the base member 18. In this manner, the signage member 20 may be swung into the open position so that the side 66 through which the advertising signage 22 may be removed and inserted is easily accessible.

Although shown inserted into side 66, it is to be understood that the advertising signage 22 may be inserted into the signage member 20 in locations other than those opposite the hinge 24. For example, the advertising signage 22 may be inserted into the top 62 and/or bottom 64 of the signage member 20 in accordance with other exemplary embodiments.

The advertising signage 22 carried by the advertising frame 10 may have a width from two to five feet in certain exemplary embodiments. In still other embodiments, the width of the advertising signage 22 may be greater than or equal to three feet. Additionally or alternatively, the advertising signage 22 carried by the advertising frame 10 may be from one to three feet in height in accordance with other exemplary embodiments. In yet other embodiments, the height of the advertising signage 22 may be greater than or equal to 1½ feet. It is to be understood, however, that the advertising frame 10 may be configured to carry advertising signage 22 of any desired size and is not limited to any particular size. For example, the advertising frame 10 and/or advertising signage 22 may extend to a location above the roof of the vehicle 16 or outboard of the sides of the vehicle 16 in accordance with various exemplary embodiments.

A backing plate 44 may be provided and may be attached to the signage member 20 in order to prevent wind generated by movement of the vehicle 16 from blowing past or through the signage member 20. It may be the case that wind will create undesirable movement of the advertising signage 22 potentially causing the advertising signage 22 to be blown from the signage member 20. The backing plate 44 may be a flat member made of steel or aluminum and may extend across the entire width and height of the signage member 20 or across only a portion thereof. In accordance with certain exemplary embodiments, the advertising signage 22 may be attached directly to the backing plate 44 so as to be secured onto the signage member 20.

Figure 6:
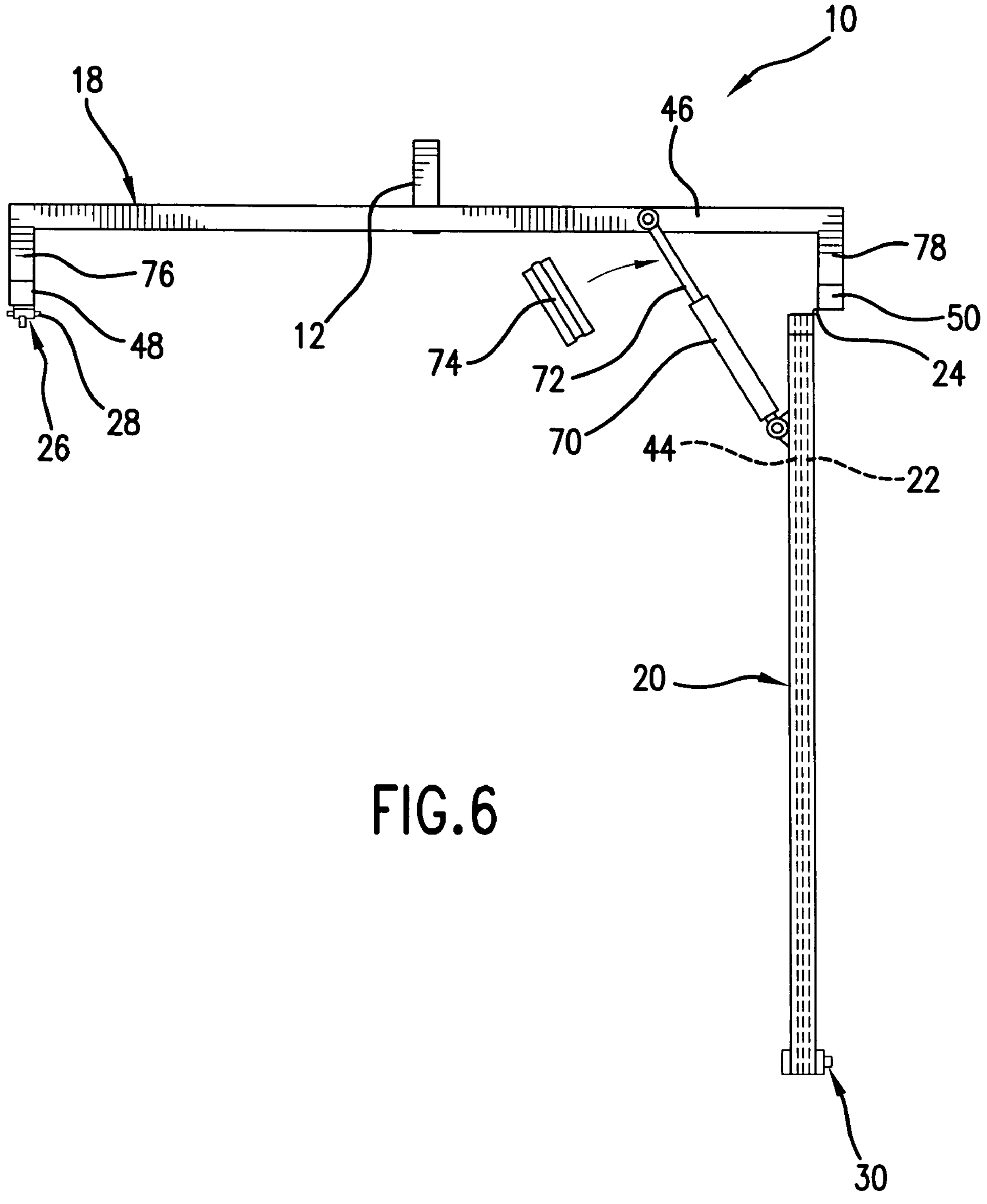
FIG. 6 is a top view of an advertising frame that includes a locking device in accordance with one exemplary embodiment.

FIG. 6 is a top view of the advertising frame 10 in accordance with one exemplary embodiment that includes a piston 70 that is attached to the signage member 20 and to the horizontal member 46 of the base member 18. The piston 70 may be selected so as to control the opening of the signage member 20. The piston 70 may also act as a locking mechanism in order to prevent the signage member 20 from swinging back towards the base member 18. In this manner, a rod cover 74 may be placed over the rod 72 so as to prevent the rod 72 from retracting into the cylinder of the piston 70. As such, the rod 72 may create a locking of the piston 70. Additionally, other mechanisms may be employed in order to lock the position of the rod 72 of the piston 70 so as to lock the signage member 20 into a desired position. Further, other mechanisms besides the piston 70 may be employed in order to lock the position of the signage member 20 with respect to the base member 18 in accordance with other exemplary embodiments. For example, the hinge 24 may be selected so as to be lockable in accordance with certain exemplary embodiments.

The advertising frame 10 may be configured to allow for any degree of pivoting between the base member 18 and the signage member 20. For example, the signage member 20 may be capable of pivoting up to 90° with respect to the base member 18 so that the signage member 20 is essentially perpendicular to the rear 32 of the vehicle 18. Alternatively, the signage member 20 may be capable of pivoting up to 120° with respect to the base member 18. Still further, the signage member 20 may be able to pivot 180° with respect to the base member 18 so that the signage member 20 is essentially parallel to the rear 32 of the vehicle 16 when opened.

Figure 7:
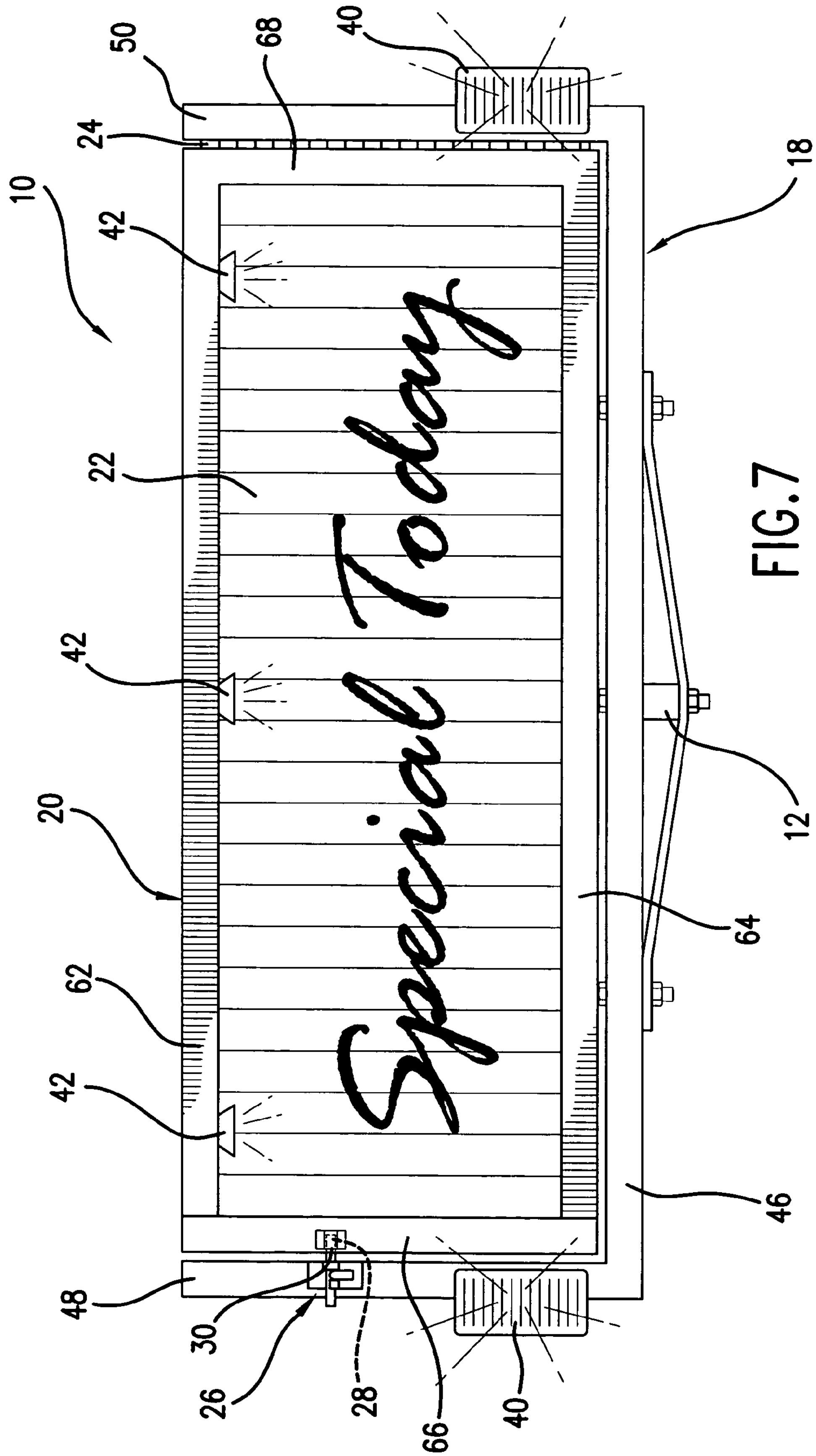
FIG. 7 is a front view of an advertising frame that includes a rear tail light assembly, lights for illuminating advertising signage, and advertising signage that is a multi-display sign in accordance with one exemplary embodiment.

FIG. 7 is a front view of an alternative exemplary embodiment of the advertising frame 10 configured to carry advertising signage 22 that is a multi-display sign. The multi-display sign may be rotatable in order to display three different advertising signs as is known in the art. Here, a mechanism may turn a plurality of slats via electronic media so as to allow for multiple advertising messages. Additionally, the multi-display sign may be variously configured so as to be capable of displaying anywhere from two to three different advertising signs. The advertising signage 22 may be easily removable from the signage member 20 or may be configured therewith so as to necessitate a larger amount of labor in order to be removed therefrom.

The advertising frame 10 includes a rear tail light assembly 40 that is attached to the vertical members 48 and 50 of the base member 18. This feature may be useful when the advertising frame 10 would otherwise obstruct portions of the rear 32, and possibly the tail lights of the vehicle 16, thus making it desirable to have the rear tail light assembly 40 located on the advertising frame 10. The rear tail light assembly 40 may include electrical attachments configured to attach to corresponding attachments on the vehicle 16 in the same manner as commonly employed with trailers that are hauled by vehicle 16.

The advertising frame 10 in FIG. 7 also includes one or more lights 42 that are attached to the signage member 20 and are used to illuminate the advertising signage 22. The lights 42 may be of any type. For instance, the lights 42 may be incandescent, fluorescent or neon lighting in various configurations. Although three lights 42 are shown, any number and/or intensity may be used in accordance with other exemplary embodiments. Further, the lights 42 need not be attached to the signage member 20 but may instead be attached to other components of the advertising frame 10 and directed onto the advertising signage 22 in order to provide for any desired illumination.

Figure 8:
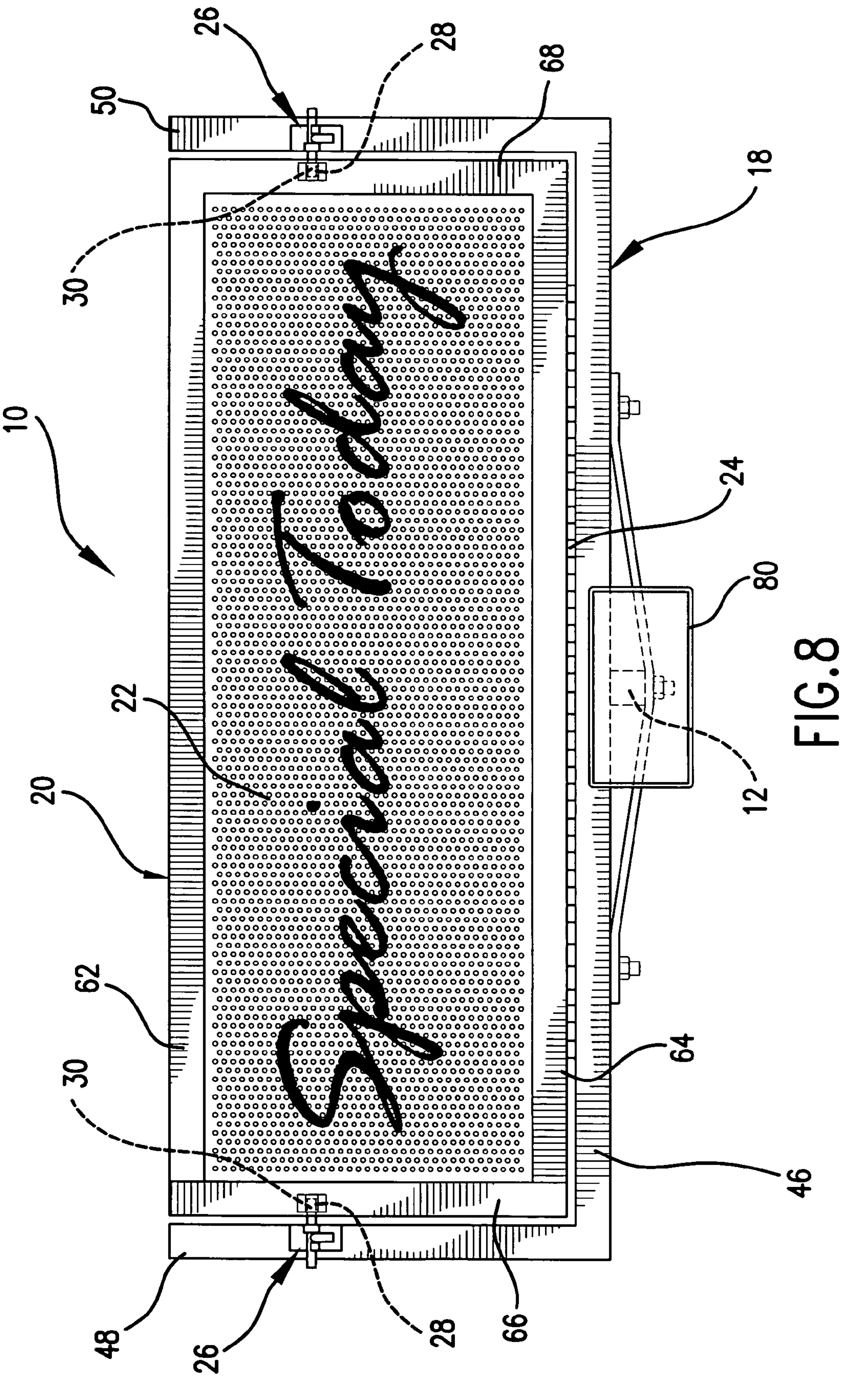
FIG. 8 is a front view of an advertising frame that includes a signage member that holds advertising signage that is an LED screen and that is vertically pivotable with respect to the base member of the advertising frame in accordance with one exemplary embodiment.

The advertising frame 10 may be configured so as to be useable with any type of advertising signage 22. For example, FIG. 8 is a front view of an exemplary embodiment of the advertising frame 10 that carries advertising signage 22 that is an LED screen that may be controlled so as to display a desired message as is commonly known in the art. Control of the advertising signage 22 may be performed by the user of the vehicle 16 or may be controlled remotely or by a microprocessor located in the LED screen. For example, a movie or clip art may be played from a DVD or other video player that may be located in the vehicle 16. Further, the LED screen may be incorporated into the signage member 20 so as to be easily removable therefrom or may be attached so as to require a greater amount of labor for removal and attachment.

The LED screen, as with all other types of advertising signage 22, may be slid in through the side 66 of the signage member 20, or may be slid in through the top 62 or bottom 64 of the signage member 20 in accordance with various exemplary embodiments. Additionally, the signage member 20 may be configured for holding the advertising signage 22 in a variety of manners besides through the use of channels 36 and 38. For example, the advertising signage 22 may be bolted, clipped, and/or snap-fitted to the signage member 20.

The exemplary embodiment of the advertising frame 10 shown in FIG. 8 includes a hinge 24 that is located on the horizontal member 46 of the base member 18. In this manner, the advertising signage 22 is pivoted downward so as to be positioned out of the way of tailgates, hatches, trunks or other components of the vehicle 16. A pair of latches 26 may be employed on the vertical members 48 and 50 so as to retain the signage member 20 in the closed position. Although not shown, the signage member 20 may be pivoted upwards in accordance with other exemplary embodiments of the present invention so as to be moved out of the way of the various storage compartments and components of the vehicle 16.

As shown in FIG. 8, the hinge 24 is attached to the horizontal member 46 of the base member 18 and to the bottom 64 of the signage member 20 so that the signage member 20 pivots about the horizontal member 46. As such, the signage member 20 is vertically pivotable in FIG. 8 as the signage member 20 pivots only in the vertical direction with respect to the base member 18. A license plate holder 80 may be attached to the advertising frame 10 if desired.

Figure 9:
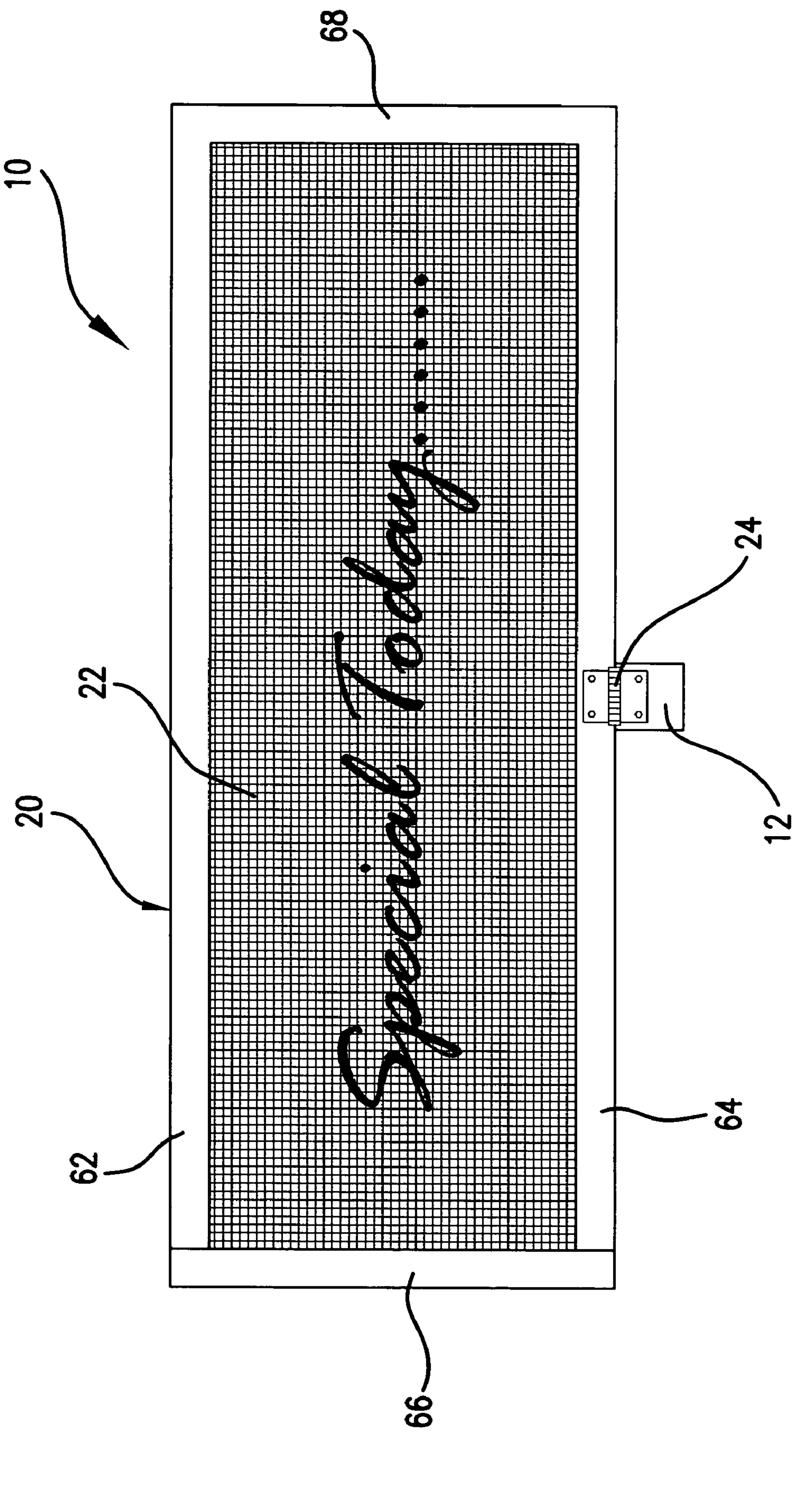
FIG. 9 is a front view of an advertising frame that has advertising signage that is a scrolling sign and is vertically pivotable with respect to the vehicle engagement member in accordance with one exemplary embodiment.

FIG. 9 shows an alternative exemplary embodiment of the advertising frame 10 in which the advertising signage 22 is a scrolling sign that displays electronic words that move from left to right. The scrolling sign may be controlled by a computer located in the vehicle 16 or remotely. Alternatively, the scrolling sign 22 may be controlled by an input located proximate to the scrolling sign 22. As shown in FIG. 9, the advertising frame 10 does not include a base member 18 as shown with previously exemplary embodiments. Here, the hinge 24 is attached directly to the vehicle engagement member 12 and the signage member 20. As shown, the signage member 20 is arranged so as to pivot downward and thus be positioned essentially parallel to the roof of the vehicle 16. The signage member 20 may be bolted or otherwise attached to the rear 32 of the vehicle 16 so as to maintain the position of the signage member 20 therewith. Alternatively, the hinge 24 may be selected so as to be lockable and thus prevent the signage member 20 from inadvertently moving into the open position.

It should be understood that the present invention includes various modifications that can be made to the embodiments of the advertising frame 10 for use with a vehicle 16 described herein as come within the scope of the appended claims and their equivalents.

The invention claimed is:

1. An advertising frame for use with a vehicle so as to render the advertising frame mobile, comprising:
- a vehicle engagement member configured for engaging a trailer hitch receiver of a vehicle;
- a base member attached to said vehicle engagement member, wherein said base member is configured for allowing a tailgate of a vehicle to be fully opened without interference of said base member when said vehicle engagement member engages the trailer hitch receiver of the vehicle;
- a signage member configured for carrying advertising signage; and
- a hinge attached to said base member and to said signage member so as to render said signage member pivotable with respect to said base member.

2. The advertising frame of claim 1, further comprising a latch configured for locking the position of said signage member with respect to the position of said base member.

3. The advertising frame of claim 1, wherein said signage member is pivotable with respect to said base member so as to be configured for providing access to the rear of a vehicle when said vehicle engagement member engages a vehicle, and wherein said base member is wider than the width of a trunk, tailgate, or hatch of a vehicle when said vehicle engagement member engages a vehicle.

4. The advertising frame of claim 1, wherein said signage member defines at least two channels configured for receiving advertising signage so as to retain the advertising signage onto said signage member.

5. The advertising frame of claim 1, further comprising a rear taillight assembly attached to said base member.

6. The advertising frame of claim 1, further comprising advertising signage carried by said signage member.

7. The advertising frame of claim 6, further comprising a light configured for illuminating said advertising signage.

8. The advertising frame of claim 6, wherein said advertising signage is selected from the group consisting of a billboard, an electronic scrolling sign, an LED screen, a flat-screen display, and a multi-display billboard.

9. The advertising frame of claim 1, further comprising a planar backing plate attached to said signage member and configured for blocking wind from blowing through said signage member.

10. An advertising frame for use with a vehicle so as to render the advertising frame mobile, comprising:

a vehicle engagement member configured for engaging a trailer hitch receiver of a vehicle;

a base member attached to said vehicle engagement member;

a signage member configured for carrying advertising signage; and a hinge attached to said base member and to said signage member so as to render said signage member pivotable with respect to said base member;

wherein:

said signage member defines a rectangular perimeter, said base member has a horizontal member attached to a pair of vertical members, and said hinge is attached to one of said vertical members of said base member and to said signage member so as to render said signage member horizontally pivotable with respect to said base member.

11. An advertising frame for use with a vehicle so as to render the advertising frame mobile, comprising:

a vehicle engagement member configured for engaging a trailer hitch receiver of a vehicle;

a base member attached to said vehicle engagement member and having a horizontal member attached to a pair of vertical members;

a signage member having an outer perimeter that is rectangular shaped, said signage member defining at least two channels configured for receiving advertising signage so as to retain the advertising signage onto said signage member;

a hinge attached to one of said vertical members of said base member and said hinge attached to said signage member so as to render said signage member horizontally pivotable with respect to said base member; and a planar backing plate attached to said signage member and configured for blocking wind from blowing through said signage member.

* * * * *